United States Patent
Champagne, Jr. et al.

(10) Patent No.: US 11,286,391 B2
(45) Date of Patent: Mar. 29, 2022

(54) REACTIVE PARTICLES FOR COATING TECHNOLOGIES

(71) Applicants: THE UNIVERSITY OF MASSACHUSETTS, Boston, MA (US); U.S. Army Research Laboratory, Adelphi, MD (US)

(72) Inventors: Victor Kenneth Champagne, Jr., Dudley, MA (US); Jessica Deborah Schiffman, Amherst, MA (US); John Klier, Leverett, MA (US); Guozhen Yang, Amherst, MA (US); Mengfei Huang, Amherst, MA (US)

(73) Assignees: THE UNIVERSITY OF MASSACHUSETTS, Boston, MA (US); U.S. ARMY RESEARCH LABORATORY, Adelphi, MD (US)

( * ) Notice: Subject to any disclaimer, the term of this patent is extended or adjusted under 35 U.S.C. 154(b) by 50 days.

(21) Appl. No.: 16/497,880

(22) PCT Filed: Apr. 9, 2018

(86) PCT No.: PCT/US2018/026693
§ 371 (c)(1),
(2) Date: Sep. 26, 2019

(87) PCT Pub. No.: WO2018/187803
PCT Pub. Date: Oct. 11, 2018

(65) Prior Publication Data
US 2020/0032071 A1    Jan. 30, 2020

Related U.S. Application Data

(60) Provisional application No. 62/482,824, filed on Apr. 7, 2017.

(51) Int. Cl.
*C09D 4/06* (2006.01)
*C08F 2/18* (2006.01)
(Continued)

(52) U.S. Cl.
CPC ............... *C09D 4/06* (2013.01); *B05D 1/12* (2013.01); *C09D 5/03* (2013.01); *C09D 7/70* (2018.01);
(Continued)

(58) Field of Classification Search
CPC ... C09D 5/03; C09D 5/031; C08F 2/18; C08F 2/20; C08F 2/22; C08F 2/24; C08F 2/26; C08F 2/28; C08F 2/30; C08F 2/44
(Continued)

(56) References Cited

U.S. PATENT DOCUMENTS 2,948,710 A  8/1960  D'Alelio et al.
3,328,374 A  6/1967  Ronden et al.
(Continued)

FOREIGN PATENT DOCUMENTS

WO         01072909 A2     10/2001
WO     WO2001072909    *  10/2001
(Continued)

OTHER PUBLICATIONS

Li et al., Composites: Part B, 49, 2013, 6-15.*
(Continued)

*Primary Examiner* — Vu A Nguyen
(74) *Attorney, Agent, or Firm* — Cantor Colburn LLP

(57) ABSTRACT

In an embodiment, a composition comprises a plurality of reactive particles; wherein at least a first portion of the reactive particles comprises a first reactive monomer located in a first matrix polymer; wherein the first reactive monomer comprises a self-reactive monomer or wherein the first reactive monomer can polymerize with a second reactive
(Continued)

monomer located in a second matrix polymer of a second portion of the reactive particles to form a coating polymer. In another embodiment, a method of making the plurality of reactive particles, comprises polymerizing a first matrix monomer in the presence of the first reactive monomer; or polymerizing the first matrix monomer to form a plurality of particles and swelling the plurality of particles with the first reactive monomer. In another embodiment, a method comprises cold spraying the plurality of reactive particles.

19 Claims, 7 Drawing Sheets

(51) Int. Cl.
| | | |
|---|---|---|
| C08F 2/22 | (2006.01) | |
| C08F 2/44 | (2006.01) | |
| C09D 5/03 | (2006.01) | |
| B05D 1/12 | (2006.01) | |
| C09D 7/40 | (2018.01) | |
| C09D 133/12 | (2006.01) | |
| C09D 163/00 | (2006.01) | |

(52) U.S. Cl.
CPC ......... *C09D 133/12* (2013.01); *C09D 163/00* (2013.01)

(58) Field of Classification Search
USPC ........................................................ 523/211
See application file for complete search history.

(56) References Cited

U.S. PATENT DOCUMENTS

| | | |
|---|---|---|
| 3,716,505 A | 2/1973 | Ohe et al. |
| 6,531,541 B1 | 3/2003 | Desai et al. |
| 8,658,742 B2 | 2/2014 | Dombrowski et al. |
| 8,900,669 B2 | 12/2014 | Lafleur et al. |
| 2006/0205870 A1 | 9/2006 | Wang et al. |
| 2008/0299391 A1* | 12/2008 | White ...................... B01J 13/14 |
| | | 428/402.21 |
| 2012/0196373 A1* | 8/2012 | Odom .................... G01N 21/78 |
| | | 436/2 |

FOREIGN PATENT DOCUMENTS

| | | | |
|---|---|---|---|
| WO | 2016175832 A1 | 11/2016 | |
| WO | WO-2016175832 A1 * | 11/2016 | ........... B29C 64/165 |

OTHER PUBLICATIONS

Zhao et al., J. Appl. Polym. Sci. 2014, 131, 41008.*
Hillewaere et al., Adv. Funct. Mater. 2014, 24, 5575-5583.*
Yi et al., Composites Science and Technology 133 (2016) 51-59.*
International Search Report; International Application No. PCT/US2018/026693; International Filing Date: Apr. 9, 2018; dated Jun. 20, 2018; 4 Pages.
Written Opinion; International Application No. PCT/US2018/026693; International Filing Date: Apr. 9, 2018; dated Jun. 20, 2018; 6 Pages.

* cited by examiner

US 11,286,391 B2

REACTIVE PARTICLES FOR COATING TECHNOLOGIES

CROSS REFERENCE TO RELATED APPLICATIONS

This application is a National Stage application of PCT/US2018/026693, filed Apr. 9, 2018, which claims the benefit of U.S. Provisional Application No. 62/482,824, filed Apr. 7, 2017, both of which are incorporated by reference in their entirety herein.

GOVERNMENT FUNDING

This disclosure was made with government support under award number AR0000000009604 part of Ref. Award Number NU 504081-78050B awarded by the U.S. ARMY RESEARCH OFFICE. The government has certain rights in the disclosure.

BACKGROUND

Coating compositions are used in a wide variety of industries for a wide variety of applications. The coating compositions can be applied as decorative coatings in order to change the visual appearance of the substrate, for example, imparting a color and/or a high gloss to the substrate. Coating compositions can also be applied in order to protect the substrate from damage due to corrosion, abrasion, impact, chemical degradation, ultraviolet light, heat, and flame.

As many coating technologies are limited, improved methods of depositing coating compositions are desired.

BRIEF SUMMARY

Disclosed herein is a reactive particle for coating technologies, methods of coating, and the coated surface.

In an embodiment, a composition comprises a plurality of reactive particles; wherein at least a first portion of the reactive particles comprises a first reactive monomer located in a first matrix polymer; wherein the first reactive monomer comprises a self-reactive monomer or wherein the first reactive monomer can polymerize with a second reactive monomer located in a second matrix polymer of a second portion of the reactive particles to form a polymer.

In another embodiment, a method of making the plurality of reactive particles comprises polymerizing a first matrix monomer composition in the presence of the first reactive monomer to form the first portion of the reactive particles comprising the first reactive monomer located in the first polymer matrix; or polymerizing the first matrix monomer to form a plurality of particles and swelling the plurality of particles with the first reactive monomer to form the first portion of the reactive particles.

In yet another embodiment, a method of forming a coating comprises cold spraying a cold spray composition comprising the plurality of reactive particles onto a substrate at a velocity sufficiently high to cause the plurality of reactive particles to deform upon contact with the substrate causing the reactive monomer to polymerize to form the coating on the substrate.

The above described and other features are exemplified by the following figures, detailed description, and claims.

BRIEF DESCRIPTION OF THE DRAWINGS

The following Figures are exemplary embodiments, which are provided to illustrate the present disclosure. Figures that are illustrative of the examples are not intended to limit devices made in accordance with the disclosure to the materials, conditions, or process parameters set forth herein.

DETAILED DESCRIPTION

Figure 1:
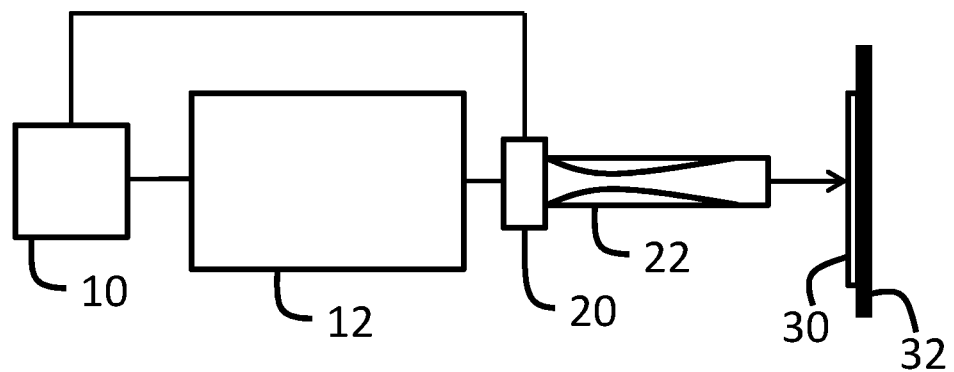
FIG. 1 is an illustration of an embodiment of a cold spray apparatus.

Methods of applying coatings such as polyurethane coatings and epoxy coatings generally include reactive two component (2K) systems in solvent carriers. The solvent carriers are often volatile organic compounds (VOCs) that can require solvent remediation steps and can make the coating process dependent on specific drying conditions to remove the solvent. The need for drying conditions, such as a controlled temperature and/or humidity can result in difficulties in coating, for example, large surfaces in outside, ambient conditions. While some solventless coating technologies have been developed, they often require heating of the components during coating to achieve the reduced viscosities needed for coating.

It was surprisingly discovered that a composition comprising a first portion of reactive particles comprising a first reactive monomer and a second portion of reactive particles comprising a second reactive monomer can be cold sprayed onto a substrate to form a coating comprising a coating polymer derived from the reactive monomers and matrix monomer present in the reactive particles. Likewise, it was surprisingly discovered that a composition comprising a plurality of reactive particles comprising a self-reactive monomer can be cold sprayed onto a substrate to form a coating comprising a coating polymer derived from the self-reactive monomer and matrix polymer present in the reactive particles. The fact that polymeric particles could even be cold sprayed was surprising as cold spraying is typically used to apply metal coatings at temperatures and pressures not conducive to polymers. In fact, prior to this discovery, polymer particles were observed to merely rebound off of the surface instead of forming a practical coating. Without being wishing to be bound by theory, it is believed that if the polymer particles have a sufficiently low glass transition temperature, for example, of less than or equal to 100° C., or −10 to 50° C., or −5 to 20° C., or −75° C. to 50° C. and a particle size of 0.05 to 500 micrometers, or 5 to 400 micrometers, or 10 to 200 micrometers, then the particles can achieve a reasonable critical velocity such that they adhere to the surface to form a coating as opposed to rebounding off of the surface. It is noted that these ranges can vary with the polymer systems as other factors such as atmospheric temperature or substrate temperature can also affect the coating ability of the cold spray technique.

It was further surprising that a cold spray composition comprising the reactive monomers housed in separate portions of reactive particles could be caused to react on a substrate as a direct response of the deformation of the particles as they contacted the substrate and not prior to the cold spraying.

The polymer coating composition and cold spraying process can result in several advantages over conventional coating methods. First, the polymer coating composition can have an increased or even unlimited shelf-life due to the fact that the reactive monomers are located within particle carriers. This improvement in shelf-life can even be observed when both portions are stored together and can be even more significant when the particles are coated with a shell composition. Second, polymer cold spraying does not require the use of a volatile solvent as the particles can be cold sprayed in the powder form, therefore eliminating the need for the use of volatile organic compounds during coating. Such a technique is therefore more environmentally friendly and can reduce capital associated with solvent remediation. Third, as the reactive monomers polymerize as a result of energy imparted during contact with the substrate, the polymerization can occur without the assistance of specialized heating or lighting equipment. Fourth, due in part to the above advantages, the polymer cold spraying can be performed inside or outside and coating can be performed regardless of ambient temperature and humidity. For example, during coating of a large object such as the hull of a boat, the large object can be coated outside during any season to result in essentially the same coating. Lastly, as there is expected to be an almost instantaneous cure, multiple coatings can be applied consecutively and there is little concern with monomer flow on the surface of the substrate or dripping.

The plurality of reactive particles can comprise a self-reactive monomer that can polymerize to form a coating polymer. The plurality of reactive particles can comprise a first portion of reactive particles that comprises a first reactive monomer embedded in a first matrix polymer; and a second portion of reactive particles that comprises a second reactive monomer embedded in a second matrix polymer. The first reactive monomer and the second reactive monomer can polymerize with each other to form a coating polymer. If a catalyst is present, the plurality of reactive particles can optionally comprise a catalyst portion of reactive particles that can comprise the catalyst or the catalyst can be located, for example, in one or both of the first portion and the second portion of reactive particles. The reactive particles can comprise an optional shell that can help to prevent the reactive monomers from diffusing out of the reactive particles.

The reactive particles can have a mean particle size, also referred to as an average diameter of 0.05 to 500 micrometers, or 50 to 900 nanometers (nm), or 1 micrometer to 500 micrometers, or 100 to 400 micrometers. The reactive particles can have an average diameter of 10 to 500 micrometers. The reactive particles can have an average diameter of 0.05 to 10 micrometers. The average diameter of the first portion of the reactive particles can be within 10% of the average diameter of the second portion. The average diameter of the first portion of the reactive particles can be greater than or equal to the average diameter of the second portion. If a third portion of the reactive particles is present, the average diameter of the third portion of the reactive particles can be less than or equal to the average diameter of the first portion.

The average diameter can be determined by measuring the average diameter of at least 100, or 100 to 1,000 particles using image analysis software or scattering techniques. The reactive particles can be spherical, though other shapes are also considered. If the particles are not spherical, then the average diameter refers to a particle size determined using light scattering techniques.

The reactive particles can comprise 25 to 80 weight percent (wt %), or 35 to 75 wt %, or 25 to 45 wt % of the reactive monomer based on the total weight of the reactive particles. An increased concentration of the reactive monomer can be obtained by incorporating not only the reactive monomer in the particles, but also by incorporating a functionalization in the matrix polymer. For example, if the matrix polymer comprises an acrylate polymer, at least a portion of the monomers from which the acrylate polymer is derived can comprise an epoxy functionalization.

The reactive particles can be formed by polymerizing a matrix monomer in the presence of a reactive monomer to form the plurality of reactive particles comprising the reactive monomer located in a polymer matrix. Conversely, the reactive particles can be formed by polymerizing the matrix monomer to form a plurality of particles and swelling the plurality of particles with a reactive monomer to form the plurality of reactive particles.

The reactive particles can be formed by a variety of different methods such as suspension polymerization, emulsion polymerization (such as micro-emulsion, mini-emulsion, or surfactant-free emulsion), emulsion solvent evaporation, salting-out, dialysis, supercritical fluid technology, and the like. Specifically, the reactive particles can be formed by one or both of suspension polymerization or emulsion polymerization. It is well understood that suspension polymerization differs from emulsion polymerization at least in that, due to the use of a water insoluble catalyst in suspension polymerization, polymer polymerization occurs in the monomer droplets, whereas due to the use of a water soluble catalyst in emulsion polymerization, polymer polymerization occurs in micelles formed in the emulsion. The result is that suspension polymerization generally results in particles having a larger than average diameter as those formed by emulsion polymerization.

The reactive particles can be formed by suspension polymerization. The suspension polymerization can comprise forming a suspension comprising the matrix monomer, a suspension medium, such as water, a suspension catalyst, a suspension stabilizer, and an optional chain transfer agent; and polymerizing, for example, while stirring and optionally heating. A suspension weight ratio of the suspension medium to the matrix monomer can be 1:1 to 10:1. Prior to polymerization, the monomer droplets can have an average largest dimension (for example, an average micelle diameter) of 50 to 500 micrometers. The polymerization mixture in the suspension polymerization process can be contained in a stirred reaction vessel that can be sealed or left open to the atmosphere. The suspension polymerization can occur at a temperature of 40 to 140 degrees Celsius (° C.), or 70 to 90° C. The reactive particles formed from suspension polymerization can be 1.0 to 500 micrometers.

The suspension catalyst can comprise a water insoluble catalyst, for example, having a solubility in water of less than or equal to 5 grams per liter, or less than or equal to 1 grams per liter, or less than or equal to 0.1 grams per liter at 25° C. The suspension catalyst can comprise a peroxide (such as t-butyl peroxyoctoate, dicumyl peroxide, benzoyl peroxide, acetyl peroxide, t-butyl peroxide, t-butyl perbenzoate, or lauroyl peroxide), an azo compound (such as azobisisobutyronitrile, 2,2'-Azobis(2-methylbutyronitrile), 2,2'-azobis(N-butyl-2-methylpropionamide), 2,2'-azobis(4-methoxy-2,4-dimethylvaleronitrile), dimethyl 2,2'-azobis(2-methylpropionate), or 1,1'-azobis(cyclohexanecarbonitrile)), or a combination comprising at least one of the foregoing.

The suspension stabilizer has a hydrophobic portion and a hydrophilic portion. The suspension stabilizer can comprise a water soluble polymer (such as poly(vinyl alcohol), hydroxypropyl cellulose, methyl cellulose, starch, gelatin, sodium poly(styrene sulfonate), or a salt of an acrylic acid-acrylate ester copolymer), a water-insoluble inorganic compound (such as talc, hydroxyapatite, barium sulfate, kaolin, magnesium carbonate, magnesium silicate, hydroxide calcium phosphate, or aluminum hydroxide), or a combination comprising at least one of the foregoing. The suspension stabilizer can be present in an amount of 0.001 to 1 wt %, or 0.001 to 0.1 wt % based on the weight of the suspension medium.

A chain transfer agent can be added to the suspension polymerization, for example, to control the molecular weight of the matrix polymer. The chain transfer agent can comprise an aliphatic mercaptan (such as lauryl mercaptan). The chain transfer agent can be present in an amount of 0.05 to 1 wt % based on a total weight of the matrix monomer.

The reactive particles can be formed by emulsion polymerization. The emulsion polymerization can comprise forming an emulsion comprising the matrix monomer, an emulsion medium, such as water, an emulsion catalyst, an emulsifying agent, and an optional chain transfer agent; and polymerizing, for example, while optionally stirring and optionally heating. An emulsion weight ratio of the matrix monomer to the emulsion medium can be 70:30 to 40:60. The total amount of monomer, including the matrix monomer and the reactive monomer, if present, can be 1 to 70 wt %, 10 to 60 wt %, or 35 to 50 wt % based on the total weight of the emulsion. Prior to polymerization, the emulsion can form micelles having an average largest dimension (for example, an average micelle diameter) of 2 to 10 nm. The reactive particles formed from emulsion polymerization can be 0.05 to 5 nm, or 0.05 to 10 nm.

The emulsion catalyst is water soluble or partially water soluble, for example, having a solubility in water of greater than or equal to 10 grams per liter, or greater than or equal to 50 grams per liter at 25° C. The emulsion catalyst can comprise a persulphate (such as potassium persulphate or ammonium persulphate), a peroxide (such as hydrogen peroxide, succinic acid peroxide, t-butyl hydro peroxide, or cumyl hydroperoxide), an azo compound (such as 2,2'-azobis(2-amidinopropane) dihydrochloride, 4,4'-azobis(4-cyanopentanoic acid), 2,2'-azobis[2-methyl-N-(2-hydroxyethyl)propionamide], 2,2'-azobis(2-methylpropionamidine) dihydrochloride, or 2,2'-azobis[2-(2-imidazolin-2-yl) propane]dihydrochloride), a redox system, or a combination comprising at least one of the foregoing. Examples of redox systems include a persulphate with a ferrous ion, a sulfite ion, a bisulfite ion, or a combination comprising at least one of the foregoing; and a peroxide (such as cumyl hydroperoxide or hydrogen peroxide) with a ferrous ion, a sulfite ion, a bisulfite ion, or a combination comprising at least one of the foregoing.

The emulsifying agent has a hydrophobic portion and a hydrophilic portion. The emulsifying agent can comprise an anionic emulsifying agent. The emulsifying agent can comprise a fatty acid soap (such as potassium oleate, sodium oleate, sodium stearate, potassium stearate, sodium laurate, potassium laurate, sodium palmitate, or potassium palmitate), a sulfate (such as sodium lauryl sulfate), a sulfonate (such as sodium dodecylbenzene sulfonate), or a combination comprising at least one of the foregoing. The emulsifying agent can optionally comprise a nonionic emulsifying agent. The nonionic emulsifying agent can comprise poly (ethylene oxide), poly(vinyl alcohol), hydroxyethyl cellulose, or a combination comprising at least one of the foregoing. The anionic emulsifying agent can be present in an amount of 0.1 to 3 wt % based on the total weight of the emulsion medium. The nonionic emulsifying agent can be present in an amount of 2 to 10 wt %, or 1 to 5 wt % based on the total weight of the emulsion medium.

A chain transfer agent can be added to the suspension polymerization, for example, to control the molecular weight of the matrix polymer. The chain transfer agent can comprise an aliphatic mercaptan (such as lauryl mercaptan). The chain transfer agent can be present in an amount of 0.05 to 1 wt % based on a total weight of the matrix monomer.

The matrix polymer can be formed from the matrix monomer. The matrix monomer can have a solubility in water of 0.05 to 30 grams per liter at 25° C. The matrix monomer can comprise an acrylate (such as methyl methacrylate, hydroxy ethyl methacrylate, N,N-dimethylamino ethyl methacrylate, methyl acrylate, ethyl acrylate, propyl acrylate, butyl acrylate, glycol dimethacrylate, vinyl methacrylate, methylene dimethacrylate, allyl acrylate, allyl methacrylate, methallyl acrylate, or 2-ethyl-hexyl acrylate), divinyl benzene, diallyl phthalate, diallyl maleate, butadiene, 2-chlorobutadiene, 1,3-isoprene, chloroprene, acrylamide, methacrylamide, N-tert-butyl acrylamide, di-N-ethyl acrylamide, styrene, an alkyl substituted styrene (such as a methyl styrene), chlorostyrene, acrylonitrile, methacrylonitrile, acrylic acid, methacrylic acid, crotonic acid, maleic acid, fumaric acid, itaconic acid, vinyl acetate, 2-vinyl pyridine, 4-vinyl pyridine, vinyl phthalimide, ethylene, a halogenated ethylene (such as tetrafluoroethylene, 1,1-difluoroethylene, tetrachloroethylene, or 1,1-dichloroethylene), propylene, vinyl fluoride, or a combination comprising at least one of the foregoing.

The matrix monomer can comprise a functionalized matrix monomer, where the functionalization can polymerize with the reactive monomer during the cold spraying. For example, the functionalized matrix monomer can comprise an epoxy functionalized monomer (such as glycidyl acrylate, glycidyl methacrylate, allyl glycidyl ether, 4,5-epoxypentylacrylate, 4,5-epoxypentylmethacrylate, or butadiene monoepoxide), a hydroxy functionalize monomer (such as hydroxyethyl acrylate or methacrylate), a carboxy functionalized monomer (such as acrylic acid, methacrylic acid, maleic anhydride, or itaconic acid), an amide or amino functionalized monomer (such as acrylamide, N-methylol acrylamide, or 2-dimethyl amino ethyl methacrylate), a vinyl ester functionalized monomer (such as vinyl acetate), or a combination comprising at least one of the foregoing. The functionalized matrix monomer can comprise an epoxy functionalized monomer such as glycidyl methacrylate.

The particle matrix polymer can be derived from one or more of the matrix monomers. Specifically, the matrix polymer can comprise, a polyacrylate, a poly(acrylic acid), a polyolefin (such as polyethylene, polypropylene, or polybutadiene), polystyrene, poly(vinyl acetate), poly(vinyl alcohol), polychloroprene, a fluoro polymer (such as polyvinylidene fluoride, polytetrafluoroethylene, or polyvinyl fluoride), polyacrylonitrile, or a combination comprising at least one of the foregoing. The polyacrylate can comprise a polyalkylmethacryalte such as poly(methyl methacrylate), poly(butyl methacrylate), or a combination comprising at least one of the foregoing.

The particles can be formed in the presence of a reactive monomer provided the reactive monomer does not polymerize with the matrix monomer. For example, if the matrix polymer comprises an acrylate polymer, the reactive monomer can comprise an epoxy or an amine hardener; or the reactive monomer can comprise an isocyanate or a polyol.

The reactive monomer can be added to the formed particles, for example, the reactive monomer can be added to a liquid composition comprising the formed particles provided that it can diffuse into the particles in an amount sufficient to polymerize during the cold spraying, for example, in an amount of at least 25 wt % based on a total weight of the particles. For example, the matrix polymer can comprise a polyurethane and the added reactive monomer can comprise an isocyanate or a polyol. When the matrix polymer comprises a polymer such as a polyurethane, a non-free radical particle formation process is used to form the particles.

After forming, the polymerized particles can be filtered, optionally rinsed with water, and dried to form a powder.

The reactive particles comprise a reactive monomer that is sufficiently soluble in the matrix polymer to allow for a concentration of the reactive monomer that can polymerize during the cold spraying. The reactive particles can comprise a self-reactive monomer that can react, for example, as a result of cold spraying the reactive particles to form the coating polymer. For example, the self-reactive monomer can comprise a cyclic lactam monomer that can react to form a polyamide, a cyclic siloxane monomer, or a norbornene type monomer to form a polynorbornene.

The self-reactive monomer can comprise the cyclic lactam monomer. The cyclic lactam monomer can comprise greater than or equal to 3 carbon atoms, or 3 to 14, or 5 to 10 carbon atoms in the lactam ring. The cyclic lactam monomer can comprise β-propiolactam (also known as 2-azetidinone), γ-butyrolactam (also known as 2-pyrrolidone), δ-valerolactam (also known as 2-piperidine), ε-caprolactam, enantholactam, caprylolactam, laurolactam, β,β-dimethylpropiolactam, α,α-dimethylpropiolactam, amylolactam, or a combination comprising at least one of the foregoing. The cyclic lactam monomer can comprise an alkyl substituted cyclic lactam, an aryl substituted cyclic lactam, or a combination comprising at least one of the foregoing. The cyclic lactam monomer can comprise ε-caprolactam. The cyclic lactam monomer can comprise a combination comprising at least one of the foregoing cyclic lactam monomers.

When the self-reactive monomer comprises a cyclic lactam monomer, the plurality of reactive particles can further comprise one or both of a catalyst (such as iminium salt prepared by reacting a base with a lactam) or an activator (such as carbodiimide, a blocked or unblocked isocyanate, a lactam, oxazoline, oxazolone, or N-substituted 2-oxazolidone), for example, in the same portion or in a different portion of reactive particles.

The self-reactive monomer can comprise the norbornene type monomer. The norbornene-type monomer can comprise a tricyclic monomers (such as dicyclopentadiene or dihydrodicyclopentadiene); a tetracyclic monomer (such as tetracyclododecene); a pentacyclic monomer (such as tricyclopentadiene); a heptacyclic monomer (such as tetracyclopentadiene), or a combination comprising at least one of the foregoing. The norbornene type monomer can comprise dicyclopentadiene. The norbornene-type monomer can comprise a functional group such an alkyl group (e.g., methyl, ethyl, propyl, or butyl), an alkylidene group (e.g., ethylidene), an aryl group (e.g., phenyl, tolyl, or naphthyl), a polar group (e.g., ester, ether, nitrile, or halogen), or a combination comprising at least one of the foregoing.

When the self-reactive monomer comprises a norbornene-type monomer, the plurality of reactive particles can further comprise one or both of a metathesis catalyst (such as a transition metal containing metathesis catalyst) or an activating agent (such as an alkyl aluminum compound or an alkyl tin compound, where the alkyl group can be a $C_{1-10}$ alkyl group), for example, in the same portion or in a different portion of reactive particles.

The plurality of reactive particles can comprise a first portion of reactive particles that comprises a first reactive monomer embedded in a first matrix polymer; and a second portion of reactive particles that comprises a second reactive monomer embedded in a second matrix polymer. The first reactive monomer and the second reactive monomer can react with each other, for example, as a result of cold spraying the reactive particles to form the coating polymer. The reactive particles can optionally comprise a catalyst capable of polymerizing the first reactive monomer and the second reactive monomer. The catalyst can be located in at least one of the first portion of the reactive particles, the second portion of the reactive particles, or a third portion of the reactive particles.

The coating polymer can comprise a thermoset polymer. The thermoset polymer can comprise an epoxy, for example, derived from an epoxy and an amine hardener. The thermoset polymer can comprise a polyurethane, for example, derived from an isocyanate and a polyol. The coating polymer can comprise a polyester, for example, derived from the esterification of an acid or an acid anhydride with an alcohol. The coating polymer can comprise a phenolic resin, for example, derived from the polymerization of phenol and formaldehyde. The coating polymer can comprise an amino polymer, for example, derived from the polymerization of urea and formaldehyde. The coating polymer can be derived from end-functionalized monomers. For example, the end-functionalized monomer can comprise a hydroxyl-terminated monomer, a methacrylate-terminated monomer, a carboxylate-terminated monomer, an epoxide-terminated monomer, an isocyanate terminated monomer, an amine-terminated monomer, or a combination comprising at least one of the foregoing. The end-functionalized monomer can be, for example, an end-terminated polybutadiene, an end-terminated polyisoprene, or a combination comprising at least one of the foregoing. For example, the end-functionalized monomer can comprise an epoxide-terminated butadiene. The coating polymer can be derived from a condensation-type polymerization reaction.

The first reactive monomer can comprise an epoxy and the second reactive monomer can comprise an amine harden. The epoxy can have a 1,2-epoxy equivalency in the average molecule of greater than 1, or greater than 1 to 4. The epoxy can have an epoxy equivalent weight of 150 to 200 grams per mole (g/mol), wherein the epoxy equivalent weight is the total weight in grams of the epoxy per 1 mol of oxirane group.

The epoxy can comprise a polyglycidyl ether of a polyhydric phenol, an epoxy novalac, a glycidylated polyphenol, a polyglycidyl ether of an alcohol (such as bisphenol A diglycidyl ether), a polyglycidyl ether of a glycol, a polyglycidyl ether of a polyglycol, a polyglycidyl ester of a polycarboxylic acid, an epoxidized linolein, or a combination comprising at least one of the foregoing. Polyglycidyl ethers of polyhydric phenols can be produced, for example, by reacting an epichlorohydrin with a polyhydric phenol in the presence of an alkali compound. The polyhydric phenol can comprise 2,2-bis(4-hydroxyphenyl)propane (bisphenol A), 2,2-bis(4-hydroxy-3-tert-butylphenyl)propane, 1,1-bis(4-hydroxyphenyl)propane, 1,1-bis(4-hydroxylphenyl)ethane, 1,1-bis(4-hydroxyphenyl)isobutane, bis(2-hydroxy-1-naphthyl)methane, 1,5-dihydroxynaphthalene, 1,1-bis(4-hydroxy-3-alkylphenyl)ethane, or a combination comprising at least one of the foregoing. The polyhydric phenol can be obtained from the reaction of phenol with an aldehyde, such as formaldehyde (bisphenol F).

The epoxy can comprise a glycidyl ether of an aliphatic alcohol, a glycidyl ether of an aromatic alcohol, a glycidyl ether of a glycol, a glycidyl ether of a polyglycol, a glycidylester of a monocarboxylic acid, or a combination comprising at least one of the foregoing. Examples include butyl glycidyl ether, phenyl glycidyl ether, cresyl glycidyl ether, 1,4-buatanediol, diglycidyl ether, or the glycidyl ester of neodecanoic acid. Such glycidyl ethers and esters can be mixed with the epoxy in concentrations of 1 to 50 wt %.

The amine hardener can comprise ethylene diamine, diethylene triamine, triethylene tetramine, tetraethylene pentamine, imadazole, dicyandiamide, or a combination comprising at least one of the foregoing.

When the thermoset polymer comprises a polyurethane, the first reactive monomer comprises an isocyanate and the second reactive monomer comprises a polyol. Typically, the isocyanate prepolymers used to prepare the coatings contain 2 or 3 isocyanate groups, although more groups are acceptable. Examples of isocyanate systems include a biuret or an isocyanurate of a diisocyanate, triisocyanate, or polyisocyanate. Typical diisocyanates prepolymers that can be used are aliphatics including cycloaliphatic, aromatic, heterocyclic, and mixed aliphatic aromatic polyisocyanates containing 2, 3 or more isocyanate groups. The isocyanate can be unblocked.

The isocyanate can comprise ethylene diisocyanate, propylene diisocyanate, tetramethylene diisocyanate, decamethylene diisocyanate, dodecamethylene diisocyanate, 2,4,4-trimethylhexamethylene-1,6-diisocyanate, phenylene diisocyanate, tolylene or naphthylene diisocyanate, 4,4'-methylene-bis-(phenyl isocyanate), 4,4'-ethylene-bis-(phenyl isocyanate), omega (ω),ω-diisocyanato-1,3-dimethyl benzene, ω,ω'-diisocyanato-1,3-dimethylcyclohexane, 1-methyl-2,4-diisocyanato cyclohexane, 4,4'-methylene-bis-(cyclohexyl isocyanate), 3-isocyanato-methyl-3,5,5-trimethyl cyclohexyl isocyanate, dimer acid diisocyanate, ω,ω'-diisocyanato-diethyl benzene, ω,ω'-diisocyanatodimethyl cyclohexyl benzene, ω,ω-diiso-cyanatodimethyl toluene, ω,ω'-diisocyanato-diethyl toluene, fumaric acid-bis-(2-isocyanato ethyl)ester or triphenylmethane-triisocyanate, 1,4-bis-(2-isocyanato prop-2-yl)benzene, 1,3-bis-(2-isocyanato prop-2-yl)benzene, or a combination comprising at least one of the foregoing. The isocyanate can comprise hexamethylene diisocyanate, diisophorone diisocyanate, toluene diisocyanate, diphenylmethane diisocyanate, bis(methylcyclohexyl) diisocyanate, or a combination comprising at least one of the foregoing. The isocyanate can comprise a biurate, e.g., defined as the partial reaction of a polyisocyanate with hydroxyl or amine components to increase terminal isocyanate groups. The isocyanates can have a low weight average molecular weight of 168 g/mol, e.g., hexamethylene diisocyanate or toluene diisocyanate.

Polyols can be characterized by their hydroxyl equivalent weight, which is equal to the average molecular weight divided by the number of equivalent hydroxyl groups. The polyols can have a hydroxyl equivalent weight of greater than or equal to 100, or 150 to 900 grams of polyol per gram equivalent of hydroxyl. The polyol can have a weight average molecular weight of greater than or equal to 90, or 90 to 30,000 g/mol, or 600 to 12,000 g/mol, or 600 to 4,000 g/mol, or 800 to 1,500 g/mol. The polyol can be straight, branched, or cyclic. They can be a water-soluble or water dispersible polyol. As used herein weight average molecular weight is determined using gel permeation chromatography based on poly(methyl methacrylate) standards.

The polyol can comprise a polyalkylene glycol (such as polyethylene glycol or polypropylene glycol), a water soluble triol, a tetrahydroxy-functional branched ethylene oxide/propylene glycol copolymer, or a combination comprising at least one of the foregoing. The polyol can comprise a vegetable oil polyol. The polyol can comprise a water soluble triol, a glycerin polymers, a multi-functional, branched polyhydroxyl compound (such as tetrahydroxy functional copolymer of ethylene oxide or propylene glycol), a tetrahydroxy functional branched/ethylene oxide/propylene glycol co-polymer, a block copolymer of polyethylene glycol and polypropylene glycol, a polyoxyethylene glycol, or a combination comprising at least one of the foregoing can also be employed.

A polyurethane catalyst can optionally be present during the cold spraying, for example, it can be present in one or more of the first portion of the reactive particles, the second portion of the reactive particles, or a third portion of the reactive particles. For example, the polyurethane catalyst can comprise an amine (such as tetramethylbutanediamine or triethylene diamine); an azine (such as 1,4 diaza(2,2,2) bicyclooctane), an organotin compound (such as tinoctoate), or a combination comprising at least one of the foregoing. The polyurethane catalyst can be present in an amount of 0.10 to 1.2 wt %, or 0.25 wt %, based upon a total weight of reactive monomer.

When the coating polymer comprises a polyurea, the first reactive monomer can comprise an isocyanate, for example, as described above and the second reactive monomer can comprise an amine, such as a polyetheramine.

When the coating polymer comprises a phenolic resin, the first reactive monomer can comprise phenol and the second reactive monomer can comprise formaldehyde. One or both of the reactive particles can comprise a catalyst, such as a base catalyst or an acid catalyst, capable of catalyzing the reaction.

When the coating polymer comprises an amino polymer, the first reactive monomer can comprise urea and the second reactive monomer can comprise formaldehyde. One or both of the reactive particles can comprise a catalyst, such as an acid catalyst, capable of catalyzing the reaction.

The coating polymer can be derived from a condensation-type polymerization reaction. For example, non-limiting examples of a condensation-type coating polymer include a polysiloxane (such as polydimethylsiloxane), a polysulfide, a polyamide (such as nylon 6,6 derived from a dicarboxylic acid an a diacyl chloride), a polyester (such a poly(ethylene terephthalate), poly(butylene terephthalate), or poly(ethylene naphthalate)), a polycarbonate (such as a bisphenol A polycarbonate), or a combination comprising at least one of the foregoing.

When the coating polymer comprises a polyester, the first reactive monomer can comprise one or both of an acid or an acid anhydride and the second reactive monomer can comprise a polyol. For example, the acid anhydride can comprise maleic anhydride and the polyol can comprise glycerol and ethylene glycol.

A shell can then be formed on the polymer particle. The shell can have a glass transition temperature of 23 to 100° C. Below 23° C., the shell may not be able to maintain the reactive monomer in the reactive particle and above 100° C., the cold spray process may have to be conducted at an elevated temperature to deform the shell. The shell can be formed by reacting an amine (such as ethylene diamine, 2-chloroethyl sulphonamide, or tris(2-aminoethylamine)) with an epoxy functionalization of the polymer matrix, epoxy monomers present in the polymer particle, or both. The amine can comprise ethylene diamine, an ethanol amine (such as mono ethanol amine, dimethanol amine, or triethanol amine), or a combination comprising at least one of the foregoing.

The shell can be formed by polymerizing a polymer shell on the particle. For example, by polymerizing a polystyrene shell on the surface of the reactive particles. The shell can be formed by crosslinking an outer layer of the polymer particle.

The shell can be formed by depositing a solid particle such as a metal, for example, by sputtering or simply adsorption on the reactive particles. The metal can comprise gold, silver, chromium, platinum, or a combination comprising at least one of the foregoing.

The plurality of reactive particles can be applied to a substrate by cold spraying. Prior to the cold spraying, the substrate can be cleaned to remove any corrosion or oxidation products. Such cleaning can be accomplished, for example, by grit blasting with alumina particles or by thermal spraying. The emulsion polymer can be applied as an aqueous dispersion.

The cold spraying can comprise mixing, into a gas stream having a working pressure and a working temperature, the plurality of reactive particles to provide a cold spray composition; accelerating the cold spray composition in a supersonic jet; and directing the supersonic jet onto a substrate, wherein the plurality of reactive particles impinges the substrate at a velocity sufficient to cause the particles to deform and the reactive monomer to polymerize and form the coating on the substrate. The cold spray composition can comprise 20 to 80 wt %, or 40 to 60 wt %, or 45 to 55 wt % of the first portion of the reactive particles based on a total weight of the first portion of the reactive particles and the second portion of the reactive particles. The cold spraying can form a coating having a thickness of greater than or equal to 0.01 mm, or 0.01 to 10 mm, or 0.01 to 1 mm.

FIG. 1 illustrates an embodiment of a cold spray process. In FIG. 1, compressed gas from gas supply 10 can be in fluid communication with one or both of particle hopper 12 and mixing chamber 20. The gas can comprise helium, nitrogen, a noble gas (such as argon), air, carbon dioxide, or a combination comprising at least one of the foregoing. The gas can comprise helium, nitrogen, argon, or a combination comprising at least one of the foregoing. The compressed gas can have a working pressure of 2.5 to 4.5 megapascals (MP) before it enters the mixing chamber. The compressed gas can have a working temperature of 0 to 800° C. before it enters the mixing chamber. When the gas is at the working temperature, it can allow for a higher velocity to be achieved in the supersonic jet and can keep the gas from rapidly cooling and freezing once it expands past the throat of the nozzle. The particle exit velocity from the nozzle can be 80 to 1,500 meters per second (m/s), 300 to 1,500 m/s, or 90 to 700 m/s, or 500 to 1,000 m/s. A particle flow rate from the nozzle can be 1 to 500 grams per minute (g/min), or 70 to 250 g/min.

The gas can be heated, for example, using an in-line heater prior to entering particle hopper 12 and mixing chamber 20. Particle hopper 12 can consist of a single particle hopper comprising the plurality of reactive particles or particle hopper 12 can comprise two or more particle hoppers, for example, comprising a first particle hopper that houses a first portion of the reactive particles and a second hopper that houses a second portion of the reactive particles.

During the cold spraying, compressed gas from gas supply 10 can enter particle hopper 12 to form a cold spray composition that can be directed towards mixing chamber 20. The compressed gas, for example, air can be at a pressure of 100 to 350 kPa, or 150 to 700 kPa. The cold spraying can occur at an applied voltage of 5 to 25 kV, or 10 to 13 kV. In mixing chamber 20, a heated pressurized gas from gas supply 10 can be further mixed with the cold spray composition. The cold spray composition can then be accelerated into a supersonic jet by passing through nozzle 22. The nozzle can be a Laval type nozzle. The supersonic jet is then directed towards substrate 32 to form coating 30 thereon. The substrate can be located 5 to 30 millimeters (mm) away from the exit port of the nozzle. The substrate 32 can be stationary and nozzle 22 can be translated during coating; substrate 32 can be translated during coating and nozzle 22 can be stationary; or both substrate 32 and nozzle 22 can be translated during coating. Repeated scanning of the substrate can often result in a more uniform coating than a single pass.

The substrate can comprise a metal (such as a metal alloy), a ceramic, a polymer, concrete, wood, or a combination comprising at least one of the foregoing. The substrate can be a steel beam, a portion of a vehicle (such as a boat, an aircraft, a road driven vehicle, or a train), a storage tank, a pipe, a wall, a roof, and the like.

The reactive particles can impinge the substrate at a velocity sufficient to cause the particles to deform and the reactive monomer to polymerize and form the coating on the substrate. If the particle velocity is too low, the particles will not have sufficient energy to cause the particles to deform and will not result in polymerization of the reactive monomer. If the particle velocity is too high it will reach the erosion velocity, where the reactive particles will erode having a high rebound coefficient, which may result in the coating not forming. Thus, there is a minimum critical velocity ($V_c$) and a maximum velocity ($V_m$) between which is an optimum velocity ($V_0$) that, at a specific temperature, gives an optimum deposition efficiency. In practical situations, monitoring gas pressure is much easier than monitoring cold spray composition velocity. Thus, gas pressure and temperature can be used to control the velocity of the cold spray composition and to avoid velocities that are too low or too high.

Before or after the spray coating, one or more coatings can be applied to the coating. For example, an ultraviolet absorbing coating, an abrasion resistance coating, an antimicrobial coating, or a combination comprising at least one of the foregoing can be added. If the coating comprises a polyacrylate, for example, that is present as the matrix polymer, the coating can inherently have some ultraviolet light absorbing properties.

In addition to the components described hereinabove, the cold spray composition can comprise an additive. Typical additives include, but are not limited to: rheological additives, heat stabilizers, ultraviolet light (UV) stabilizers, UV absorbers, fillers (such as talc or silica), reinforcing agents, antioxidants, color stabilizers, light stabilizers, lubricants, mold release agents, colorants, dyes, antistatic agents, flame retardants, anti-drip agents, gamma stabilizers, impact modifiers, X-ray contrast agents, or a combination comprising at least one of the foregoing. The additives usually comprise a total of less than or equal to one part per hundred by weight of the coating or substrate.

The coating can comprise an interpenetrating network of the matrix polymer and the polymer derived from the reactive monomers. The coating can comprise 25 to 80 wt %, or 35 to 75 wt %, or 25 to 45 wt % of the polymer derived from the reactive monomers based on the total weight of the coating.

The coating can have a relatively low glass transition temperature, which can allow for the powder to react at room temperature (for example, at 23° C.). The matrix polymer of the reactive particles can have a low glass transition temperature as compared to the glass transition temperature of the coating polymer to result in a coating with an improved glass transition temperature. If the coating polymer comprises an epoxy, then the epoxy can be cross-linked to further enhance the coating properties similar to those of high performance thermosets, including improved toughness, strength, Young's modulus, chemical resistance, and durability.

The following examples are provided to illustrate articles with enhanced thermal capability. The examples are merely illustrative and are not intended to limit devices made in accordance with the disclosure to the materials, conditions, or process parameters set forth therein.

EXAMPLES

In the examples, the glass transition temperature ($T_g$) was determined using differential scanning calorimetry (DSC). The $T_g$ was determined by the change of heat capacity measured by DSC, where the $T_g$ was determined using the content of small molecule bisphenol A diglycidyl ether (DGEBA) in the particle. The sample was equilibrated at −70° C., heated to 150° C. at a rate of 10° C./min, cooled to −70° C. at a rate of 10° C./min, and heated to 150° C. The value of the $T_g$ was determined using the inflection method.

Thermogravimetric analysis (TGA) was performed using a heating ramp from room temperature to 600° C. under nitrogen.

Examples 1-9: Formation of a First Portion of Reactive Particles

Poly(vinyl alcohol) (weight average molecular weight 13,000-23,000 g/mol, 87 to 89% hydrolyzed) was dissolved into DI water in a 250 milliliter (mL) glass round-bottom flask equipped with a condenser circulating cooling water and a magnetic stirring bar at room temperature at 1,000 revolutions per minute (rpm). After the inhibitor removal, methyl methacrylate was mixed with benzoyl peroxide (BPO) and bisphenol A diglycidyl ether (DGEBA) and poured into the flask, the amounts of which are shown in Table 1 in parts by weight (pbw). The reaction was purged by nitrogen. The solution was stirred at 70° C. and 650 rpm for 3 hours, followed by cooling back to room temperature. The particle product was filtrated using a Buchner filter and dried in a convection oven. As a result, the output DGEBA percentage was well controlled and was consistent with the input as shown in Table 1. Glassy spherical beads were obtained with up to 37.0 wt % DGEBA. The glass transition temperature, close to room temperature, can make the powder coating reaction occur at low temperatures. This low glass transition temperature can make it possible to diffuse and mix multiple components at low temperatures during the cold spray process. The $T_g$ and the particle size in micrometers are shown in Table 1 and the $T_g$ with DGEBA concentration is illustrated in FIG. 2.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| MMA (pbw) | 16 | 16 | 16 | 16 | 16 | 16 | 16.0 | 12.8 | 9.6 | 8 |
| BPO (pbw) | 0.4 | 0.4 | 0.4 | 0.4 | 0.4 | 0.4 | 0.4 | 0.4 | 0.4 | 0.2 |
| PVA (pbw) | 0.8 | 0.8 | 0.8 | 0.8 | 0.8 | 0.8 | 0.8 | 0.8 | 0.8 | 0.8 |
| DI water (pbw) | 80 | 80 | 80 | 80 | 80 | 80 | 80 | 80 | 80 | 80 |
| DGEBA (pbw) | 0.8 | 1.6 | 3.2 | 6.4 | 9.6 | 12.8 | 16.0 | 16.0 | 16.0 | 4.8 |
| input DGEBA (wt %) | 4.65 | 8.89 | 16.33 | 28.07 | 36.92 | 43.84 | 49.50 | 54.90 | 61.70 | 37.0 |
| output DGEBA (wt %) | 4.72 | 9.67 | 18.68 | 29.00 | 37.33 | 43.44 | 51.50 | 58.30 | 64.30 | 40.1 |
| $T_g$ (° C.) Tg (° C.) | 95.6 | 76.2 | 68.0 | 42.2 | 20.5 | — | 4.7 | −1.8 | −3.0 | 20.0 |
| Particle size | 37 ± 44 | 15 ± 11 | 23 ± 26 | 52 ± 31 | 25 ± 27 | N/A | N/A | N/A | N/A | 49 ± 48 |

Figure 2:
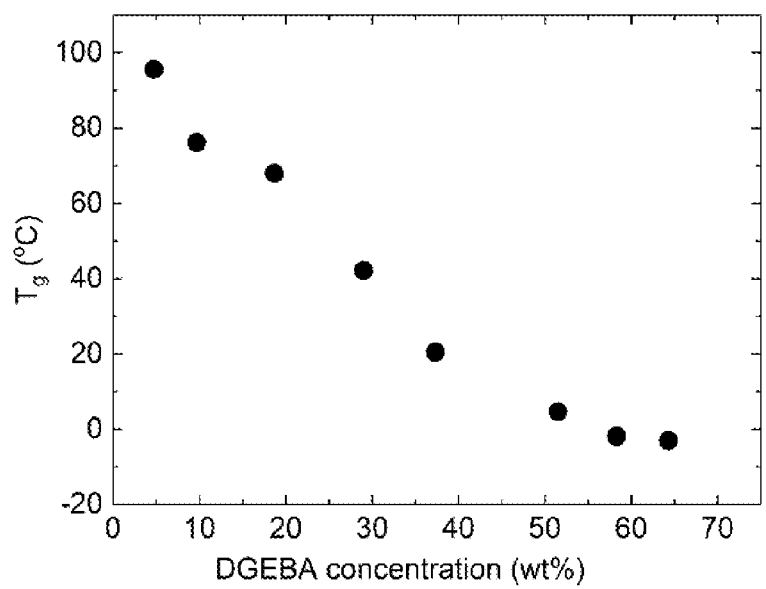
FIG. 2 is a graphical illustration of the glass transition temperature with bisphenol A diglycidyl ether concentration of Examples 1-5.

Table 1 and FIG. 2 illustrate that there is a linearly negative correlation of $T_g$ with DGEBA concentration.

Figure 3:
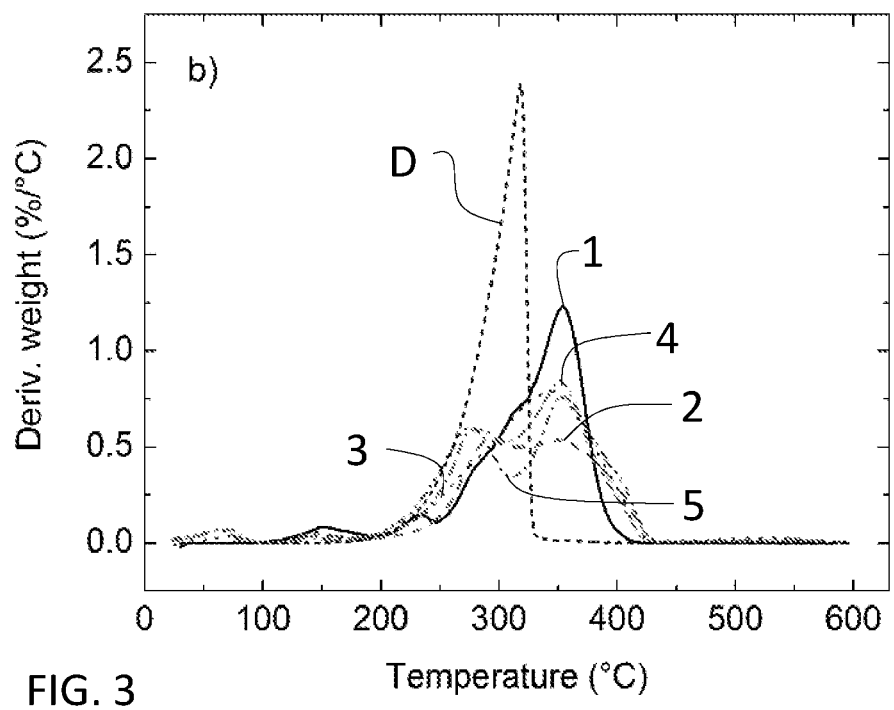
FIG. 3 is a graphical illustration of the derivative weight with degree Celsius versus temperature of Examples 1-5.

TGA was performed on the particles of Examples 1-5 and the derivative weight per degree Celsius (Deriv. weight) in %/° C. with temperature are shown in FIG. 3 and compared to the TGA of a DGEBA sample (D). FIG. 3 shows the existence of double peaks in Examples 4 and 5, indicating the presence of DGEBA in the particles.

Example 10: Formation of Non-Shell Reactive Particles in a 1 L Scalable Reactor The dispersing agent PVA (weight average molecular weight 146,000 to 186,000 g/mol; 87-89% hydrolyzed) was dissolved into DI water at room temperature and at 300 rpm in a 1 L glass cylindrical flask, which was equipped with a condenser circulating cooling water, a temperature system, overhead glass stirring assembly with variable speed motor and controller, and a glass baffle. After the inhibitor was removed by aluminum oxide, MMA was mixed with BPO and DGEBA until the mixture turned homogenous, and then poured into the flask. The reaction was purged by nitrogen. The emulsion was stirred at room temperature and 300 rpm for 30 min. The setting was adjusted to 70° C. and 150 rpm and was maintained for 3 h, then followed by cooling back to room temperature. The particle products were filtrated by a Buchner filter and dried in a convection oven at 50° C. The $T_g$ and the particle size in micrometers are shown in Table 1.

Figure 4:
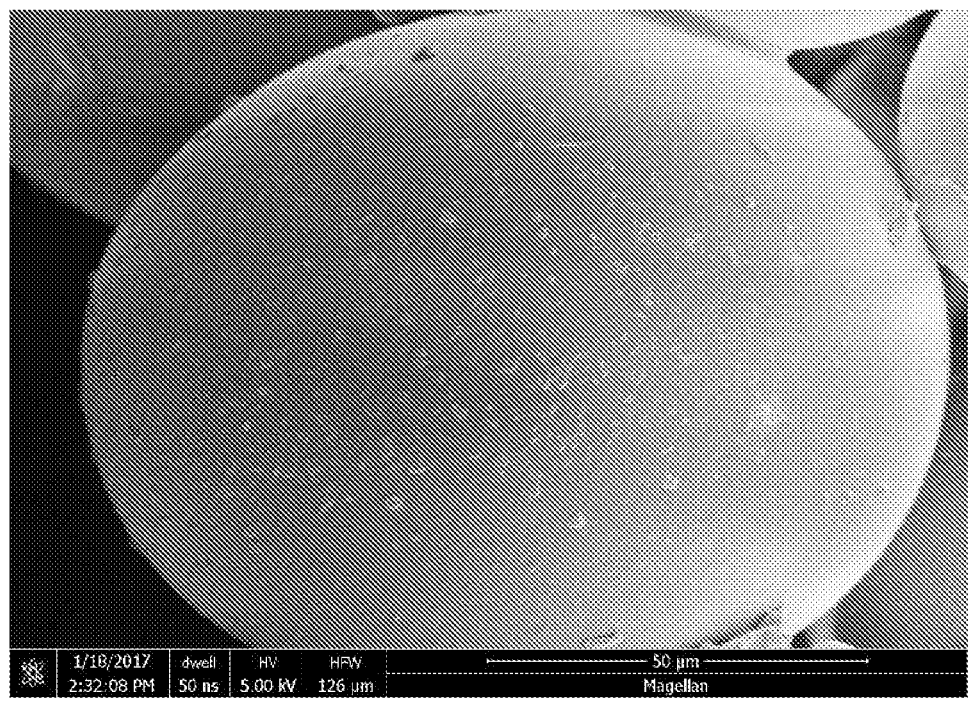
FIG. 4 is a scanning electron microscope image of a particle of Example 8.

FIG. 4 is a scanning electron microscopy image of the surface of one of the particles of Example 10.

Figure 5:
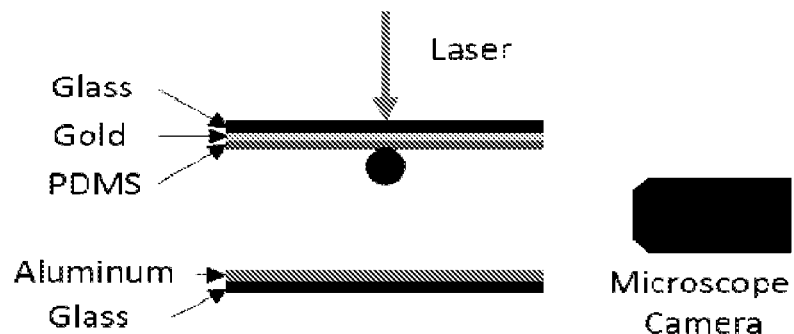
FIG. 5 is an illustration of the experimental set-up of Example 11.
Figure 6:
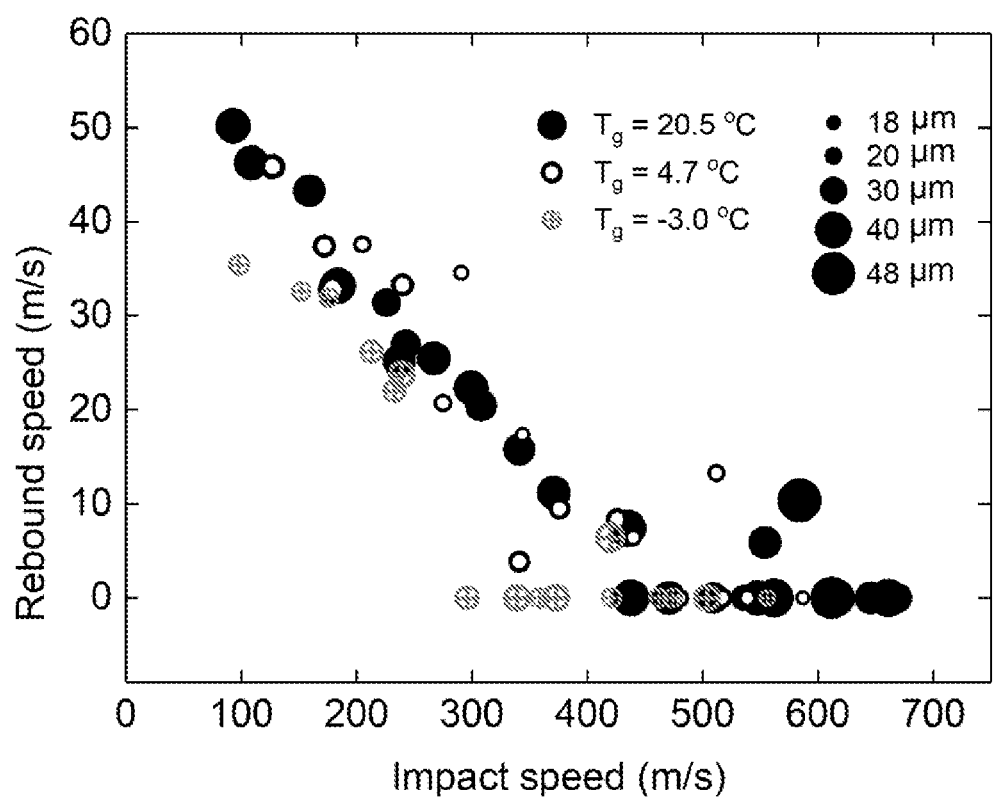
FIG. 6 is a graphical illustration of the rebound speed versus impact speed of the particles of Example 11.

Example 11: Evaluation of High-Speed Non-Shell Particle Adherence at Room Temperature The cold spray tests of high-speed particles were conducted using a Laser Induced Projectile Impact Test (LIPIT, FIG. 5). Briefly, at room temperature, individual particles from Examples 7, 9, and 10 having diameters of 17 to 42 micrometers (where the size of the circles in the graph indicate relative the particle size of the particles as indicated in the legend in micrometers) were individually projected toward an aluminum substrate (commercial polished Al 6061) by a high-energy laser and the movement was recorded using a microscope camera. In FIG. 6 the filled in circles are particles of Example 10 having a $T_g$ of 20° C., the open circles are particles of Example 7 having a $T_g$ of 4.7° C., and the crossed circles are single particles of Example 9 having a $T_g$ of −3.0° C. The particle speed range was 92 to 669 m/s.

The rebound speed decreased as the impact speed increased linearly until it reached a critical speed (shown in FIG. 6). The critical speeds are shown in Table 2. The critical speed decreased as the $T_g$ became lower, because the higher viscosity tended to incur the deformation upon the impact. Example 9 with a $T_g$ of −3° C. exhibited a critical speed at 296 m/s that is significantly lower than 438 m/s shown in Example 10 with a $T_g$ of 20° C. that adhered. Depositing the core shell particle above the critical velocity resulted in very good adhesion to the substrate and the desired coating.

TABLE 2

| Example | 9 | 7 | 10 |
| --- | --- | --- | --- |
| Tg (° C.) | −3.0 | 4.7 | 20.0 |
| Critical speed (m/s) | 296 | 481 | 438 |

Figure 7A:
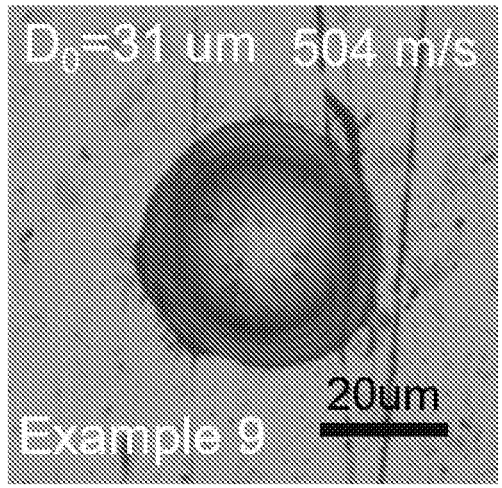
FIG. 7A and FIG. 7B are optical microscopy images of impacted particles of Example 11.
Figure 7B:
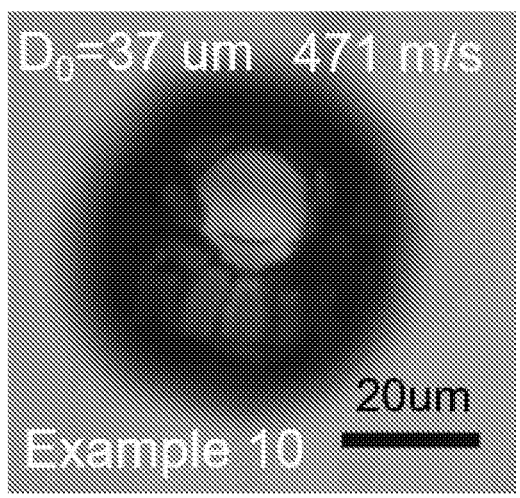

FIG. 7A and FIG. 7B are optical microscopy images of the morphology of one of the particles of Example 9 and 10, respectively, that impacted on the substrate at a speed greater than the critical speed at room temperature. The particle of Example 10 having a $T_g$ of 20° C. cracked, see FIG. 7B, whereas the particle of Example 9 having a $T_g$ of −3° C. increased in size around the edge of the initial particle size (i.e., expanded upon hitting the surface), see FIG. 7A.

Example 12: Evaluation of Low-Speed Powder Coating at Elevated Temperature

A low-velocity electrostatic powder coating was conducted using a powder coating machine (Grizzly T25100, Bellingham, Wash.) with a nozzle diameter of 1.9 cm, an applied voltage (10 to 13 kilovolts (kV)), and compressed air at 206 kilopascal (kPa). Example 10 (of 15 g) were loaded into the powder coating machine. Deposition efficiency was evaluated as a function of temperature (160 to 280° C.) by spraying 0.3 g particles towards a pre-heating an aluminum plate (5 cm×5 cm) wrapped with aluminum foil using a 5 cm separation distance.

Below 160° C., no particle adherence was observed, while at 160° C. or above, the deposition efficiency increased positively with the temperature of substrate, where up to about 70% of the total particles at 220° C. adhered with the add-on of high voltage (Table 3).

TABLE 3

| Substrate Temperature (° C.) | Deposition Efficiency without Voltage | Deposition Efficiency with Voltage |
| --- | --- | --- |
| 160 | 10% | 29% |
| 180 | 15% | 33% |
| 200 | 26% | 68% |
| 220 | 29% | 70% |

In the high-voltage electric field, the particles, charged positively at the nozzle of the spray gun, experienced an extra driving force perpendicularly toward the surface of substrate that was charged negatively. The extra driving force pushed the particles towards the surface, increasing the contact surface between particles and substrate, and ultimately resulted in an enhancement of the coalescence.

Figure 8:
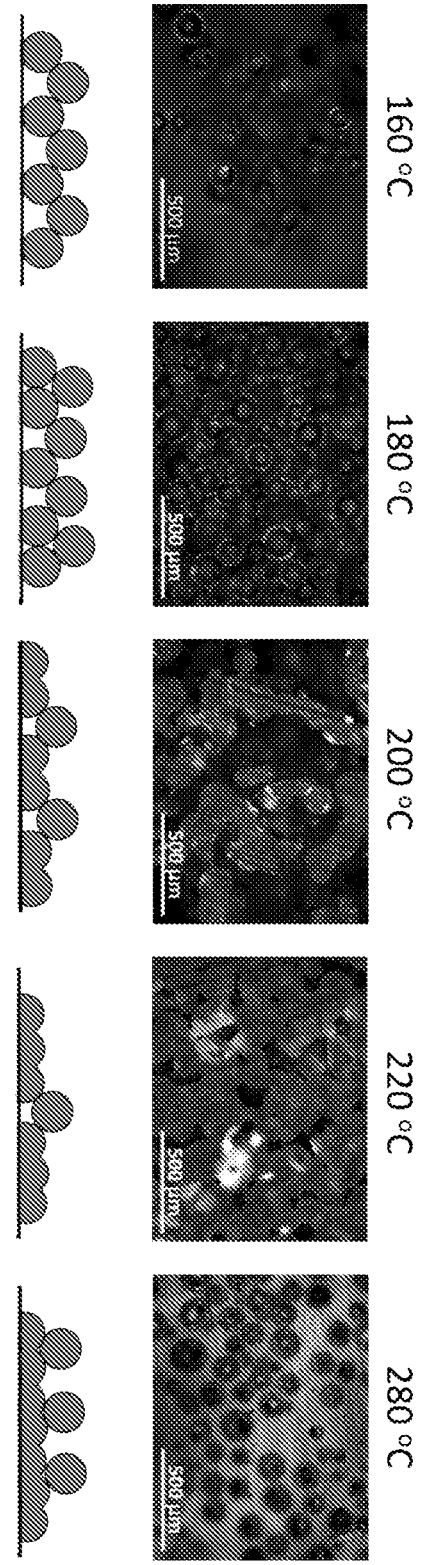
FIG. 8 are optical microscopy images and illustrations of the interface between the polymer coatings and the aluminum substrate of Example 12 with increasing substrate temperature.

Optical images of the interface between polymer coatings and the aluminum substrate and the lateral section of particles adherent to the substrate are shown in FIG. 8. The straight-line texture, resulted from the surface of substrate, indicating the coating interface area between particles and substrate surface. As the temperature of the substrate increased, adherent surface area increased. At temperatures of 200° C. or higher, continuous straight-line texture extended across the coating area of different particles, demonstrating the coalescing behavior of the coating particles at 200° C. or higher temperatures. This scenario of polymer coalescence further enhancing the deposition over the adherence between polymer particle and aluminum substrate, can result in the dramatic improvement in deposition efficiency as shown in Table 3. The success of particle coalescence at the substrate illustrates that forming a coating from particles comprising different components could coalesce to react to form the coating.

Example 13: Formation of Core-Shell Reactive Particles in a 1 L Scalable and Single-Pot Reactor The dispersing agent PVA (weight average molecular weight 146,000 to 186,000 g/mol; 87-89% hydrolyzed) was dissolved in DI water at room temperature at 300 rpm in a 1 L glass cylindrical flask, which was equipped with a condenser circulating cooling water, a temperature system, overhead glass stirring assembly with variable speed motor and controller, and a glass baffle. After the inhibitor was removed by aluminum oxide, butyl acrylate (BA) was mixed with 2,2'-azobis(2-methylpropionitrile) (AIBN), 4,4'-methylenebis(phenyl isocyanate) (MDI) and DGEBA until the mixture was homogenous. The homogeneous mixture was then poured into the flask. The emulsion was stirred at room temperature and 300 rpm for 30 min. The setting was adjusted to 150 rpm and diethylenetriamine (DETA) was added dropwise into the reactor. The temperature was adjusted to 60° C. and was maintained for 1 h, and then adjusted to 80° C. for 3 h. The reaction was purged with nitrogen. After cooling back to room temperature, the particle products were filtrated using a Buchner filter and naturally dried at room temperature. The amounts of the components in parts by weight (pbw) and results are shown in Table 4.

TABLE 4

| Example | 13 |
| --- | --- |
| BA (pbw) | 24.0 |
| AIBN (pbw) | 1.2 |
| PVA (pbw) | 8 |
| DI water (pbw) | 800 |
| DGEBA (pbw) | 40 |
| MDI (pbw) | 24 |
| DETA (pbw) | 10.0 |
| Core | |
| DGEBA (wt %) | 71.5 |
| PBA (wt %) | 28.5 |
| Tg (° C.) | −39.0 |
| Shell thickness (micrometer) | 17.0 ± 4.7 |
| Particle size (micrometer) | 195 ± 98 |

Figure 9:
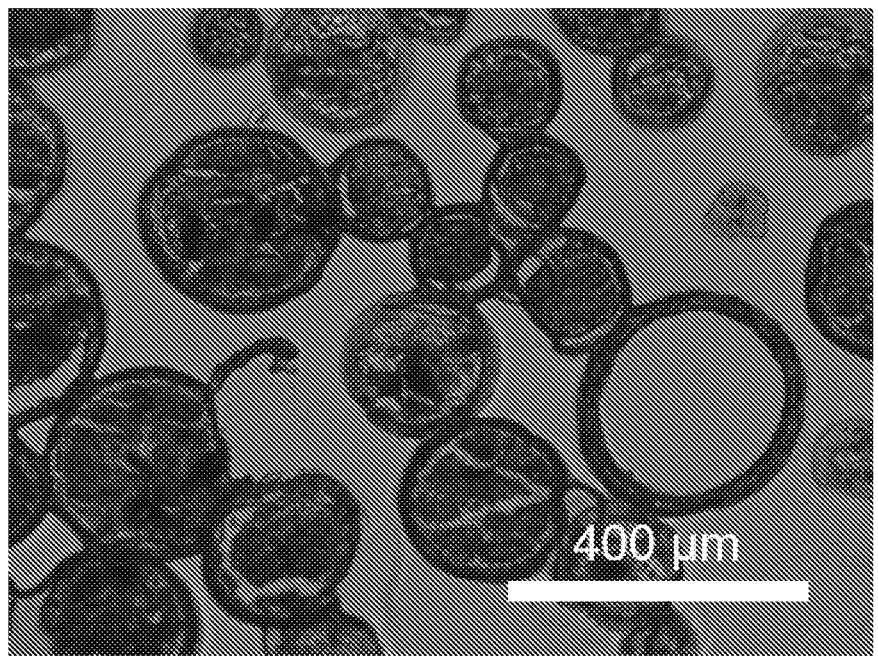
FIG. 9 is an optical microscopy image of particles obtained from the crystat microtoming of Example 13.
Figure 10:
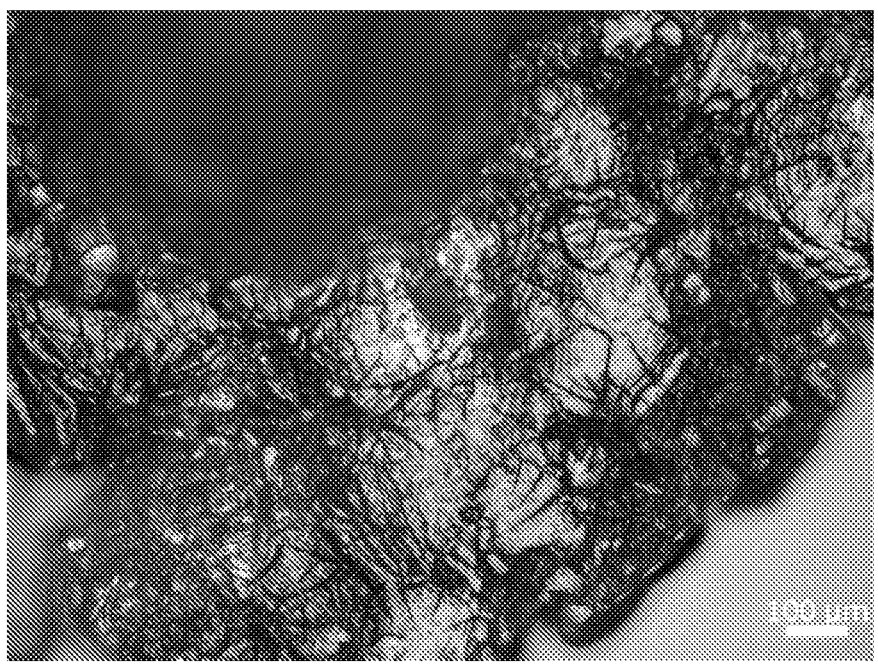
FIG. 10 is an optical microscopy image of particles crushed in between two glass slides as described in Example 13.

A cross section of particles of Example 13 obtained by cryostat microtome is shown in FIG. 9. In obtaining the image, the particles were first mixed at an optimal cutting temperature compound (OCT), followed by freezing to −60° C. The bulk matrix was cut at −20° C. to a 10 micrometer thickness. The slides of samples were soaked in tetrahydrofuran (THF) for several seconds. The core shrank and detached from the shell. The structure of soft core and the brittle shell was demonstrated by pressing the particles by hand between two glass slides. The FIG. 10 shows that after the pressing, the brittle shell broke while the soft core squeezed out.

Example 14: Evaluation of High-Speed Core-Shell Particle Adherence at Room Temperature Particle impact experiments were conducted in accordance with Example 11. At room temperature, the particle of Example 13, diameter 58 to 126 micrometers was projected toward an aluminum substrate (commercial polished Al 6061) by a high-energy laser and the movement was recorded using a microscope camera. The particle speed range was 156 to 545 m/s. The critical speed was 308 m/s, above which 100% of all particles deposited on the substrate.

Figure 11:
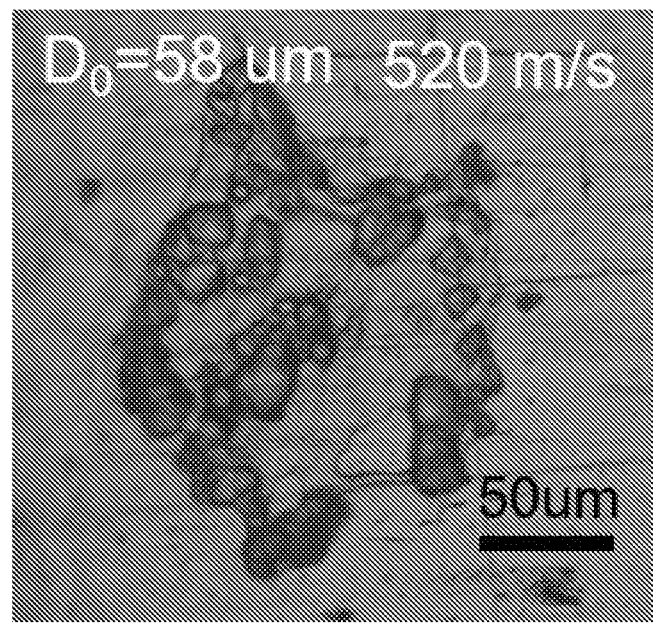
FIG. 11 is an optical microscopy image of Example 14 of the morphology of particles that impacted on the substrate.

FIG. 11 is an optical microscopy image of the morphology of one of the particles of Example 13 that impacted on the substrate at a speed greater than the critical speed at room temperature. Core-shell particles with a $T_g$ of −39° C. had the shell shattered and the core splashed, similar to how throwing a raw egg hitting and breaking on a wall.

Figure 12:
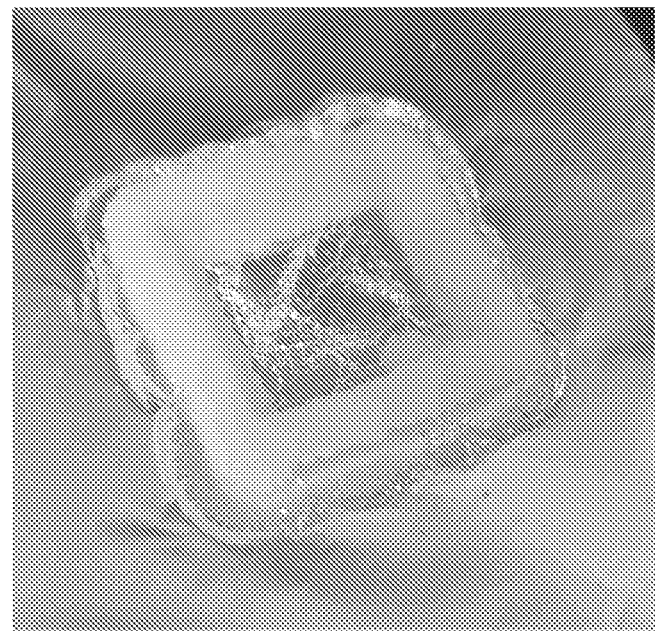
FIG. 12 is a low magnification optical microscopy image of the coating of Example 15.
Figure 13:
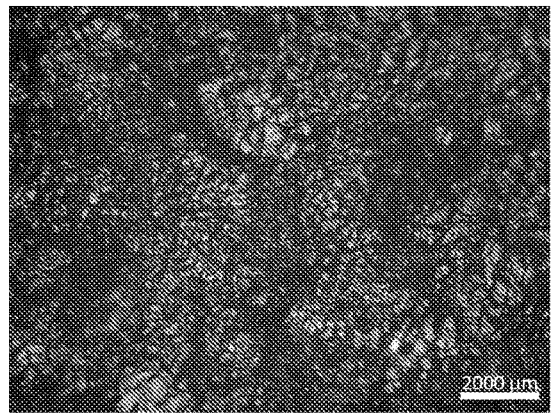
FIG. 13 is an optical microscopy image of the coating of Example 15.

Example 15: Evaluation of Cold Spray Behavior of Core-Shell Particles at Room Temperature 21 g of the core-shell particles of Example 13 were sprayed by a cold spray facility at room temperature and the pressure of 75 pounds per square inch (517 kilopascal). The particles were deposited in a square shape on a collector substrate. It was calculated that the particle velocity at the nozzle exit was 160±36 m/s; the particle temperature at the nozzle exit was 14.5±3.5° C.; the particle impact velocity was 175±37 m/s; and the particle temperature at impact was 12.5±4.5° C. The achieved coating is shown in FIG. 12 and FIG. 13 that are optical microscopy images of the interface between the coating and the aluminum substrate. FIG. 13 shows the homogeneous coalescence among those particles, which can enable the two-component thermosetting polymer coatings. Deposition efficiency was 3% in this example where the particle velocity at the nozzle exit was 160±36 m/s.

Example 16: Formation of Reactive Particles Containing Hardener

Poly(vinyl alcohol) (weight average molecular weight 146,000 to 186,000 g/mol, 87 to 89% hydrolyzed) was dissolved into DI water in a 250 milliliter (mL) glass round-bottom flask equipped with a condenser circulating cooling water and a magnetic stirring bar at room temperature at 1,000 revolutions per minute (rpm). After the inhibitor removal, methyl methacrylate was mixed with AIBN and phenalkamine (NX 5594, soluble in MMA and insoluble in water) and poured into the flask, the amounts of which are shown in Table 5 in parts by weight (pbw). The reaction was purged by nitrogen. The solution was stirred at 70° C. and 650 rpm for 3 hours, followed by cooling back to room temperature. The particle product was filtrated using a Buchner filter and dried in a convection oven. The $T_g$ are shown in Table 5. There are two $T_g$s for the particles, one of which is much lower than room temperature. The particles are soft and free-flowing at ambient conditions.

TABLE 5

| Example | 16 |
| --- | --- |
| MMA (pbw) | 8 |
| AIBN (pbw) | 0.4 |
| PVA (pbw) | 8 |
| DI water (pbw) | 80 |
| NX 5594 (pbw) | 4.8 |
| NX 5594 (wt %) | 45.2 |
| Tg (° C.) | 90.6 |
| | −8.1 |

Example 17: The Reaction Between the Particles Containing Epoxy Resin and Amine Respectively Particles of Examples 13 and 17 were crushed at room temperature, put into DSC, equilibrated at −70° C., and heated to 170° C. at a rate of 10° C./min. The onset temperature of curing reaction was 57° C.

Examples 18-31: Formation of Reactive Nanoparticles

Figure 15:
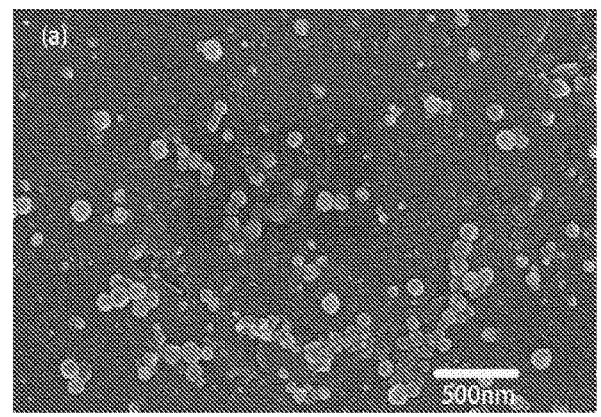
FIG. 15 is a scanning electron microscopy image of the nanoparticles of Example 18.
Figure 14:
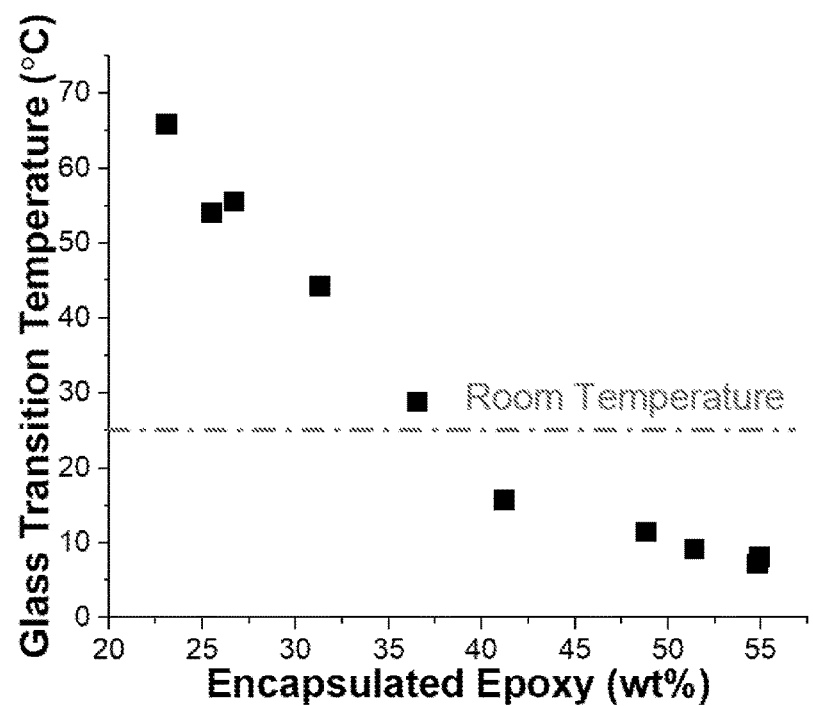
FIG. 14 is a graphical illustration of the glass transition temperature with DGEBA concentration of Examples 18-31.

Sodium dodecyl sulfate (SDS) was dissolved into DI water in a 250 milliliter (mL) glass round-bottom flask equipped with a condenser circulating cooling water and a magnetic stirring bar at room temperature at 370 revolutions per minute (rpm). After the inhibitor removal, methyl methacrylate was mixed with bisphenol A diglycidyl ether (DGEBA) the amounts of which are shown in Table 6 in parts by weight (pbw). 20% of the mixture of MMA and DGEBA was poured into the flask and maintained for 5 minutes. Potassium persulfate (KPS) was dissolved into 33.3% of DI water and fed into the flask at the rate of 130 ul/min. The reaction was purged by nitrogen at 70° C. and maintained for 1.0 hour to form seeds. The remaining mixture of MMA and DGEBA was fed at the rate of 300 microliters per minute for 1.5 hours. After the completion of the feeding, the solution was stirred for another at 70° C. and 370 rpm for 1 hour, followed by cooling back to room temperature. As a result, the output DGEBA percentage was well controlled and was consistent with the input as shown in Table 6. The $T_g$ and the particle size in nanometers are shown in Table 6 and the $T_g$ with DGEBA concentration is illustrated in FIG. 14. FIG. 15 is a scanning electron microscopy image of the particles of Example 18.

polymer matrix each independently comprise a polyacrylate, a poly(acrylic acid), a polyolefin, polystyrene, poly(vinyl acetate), poly(vinyl alcohol), polychloroprene, a fluoro polymer, polyacrylonitrile, a polyurethane, or a combination comprising at least one of the foregoing.

Embodiment 5

The composition of any one of the preceding embodiments, wherein the first polymer matrix and the second polymer matrix each independently comprise a polyacrylate.

Embodiment 6

The composition of Embodiment 5, wherein the polyacrylate comprises repeat units derived from a reactive acrylate monomer, preferably, glycidyl methacrylate.

Embodiment 7

The composition of any one of the preceding embodiments, wherein the first polymer matrix and the second

TABLE 6

| | Example | | | | | | | | | | | | | |
|---|---|---|---|---|---|---|---|---|---|---|---|---|---|---|
| | 18 | 19 | 20 | 21 | 22 | 23 | 24 | 25 | 26 | 27 | 28 | 29 | 30 | 31 |
| MMA (pbw) | 20.0 | 20.0 | 20.0 | 20.0 | 20.0 | 20.0 | 20.0 | 20.0 | 18.0 | 17.0 | 15.0 | 12.0 | 9.0 | 6.0 |
| KPS (pbw) | 0.2 | 0.2 | 0.2 | 0.2 | 0.2 | 0.2 | 0.2 | 0.2 | 0.2 | 0.2 | 0.2 | 0.2 | 0.2 | 0.2 |
| SDS (pbw) | 0.4 | 0.4 | 0.4 | 0.4 | 0.4 | 0.4 | 0.4 | 0.4 | 0.4 | 0.4 | 0.4 | 0.4 | 0.4 | 0.4 |
| DI water (pbw) | 30 | 30 | 30 | 30 | 30 | 30 | 30 | 30 | 30 | 30 | 30 | 30 | 30 | 30 |
| DGEBA (pbw) | 6.0 | 7.0 | 8.0 | 9.0 | 12.0 | 15.0 | 18.0 | 20.0 | 20.0 | 20.0 | 20.0 | 20.0 | 20.0 | 20.0 |
| input DGEBA (wt %) | 23.1 | 25.9 | 28.1 | 31.0 | 37.5 | 42.8 | 47.4 | 50.0 | 52.6 | 54.5 | 57.1 | 62.5 | 69.0 | 76.9 |
| Encapsulated DGEBA (wt %) | 23.1 | 25.3 | 26.7 | 30.6 | 35.8 | 40.2 | 45.4 | 48.0 | 51.4 | 54.9 | 54.8 | 55.2 | 54.1 | 56 |
| Tg (° C.) | 65.9 | 54.1 | 55.6 | 44.2 | 28.9 | — | — | 11.5 | 9.2 | 8.1 | 7.2 | — | 3.4 | — |
| Particle size, mean (nm) | 71 | 73 | 71 | 88 | 89 | 76 | 77 | 68 | 81.6 | — | 71.7 | 75.7 | 74.5 | 80.8 |

Set forth below are non-limiting embodiments of the present disclosure.

Embodiment 1

A composition comprising: a plurality of reactive particles; wherein at least a first portion of the reactive particles comprises a first reactive monomer located in a first matrix polymer; wherein the first reactive monomer comprises a self-reactive monomer, or wherein the first reactive monomer can polymerize with a second reactive monomer located in a second matrix polymer of a second portion of the reactive particles to form a coating polymer.

Embodiment 2

The composition of Embodiment 1, further comprising the second portion of the reactive particles.

Embodiment 3

The composition of any one of the preceding embodiments, wherein the first polymer matrix and the second polymer matrix each independently comprise a vinyl polymer.

Embodiment 4

The composition of any one of the preceding embodiments, wherein the first polymer matrix and the second polymer matrix each independently comprise a functionalized repeat unit derived from an epoxy functionalized monomer, a hydroxy functionalize monomer, a carboxy functionalized monomer, an amide or amino functionalized monomer, a vinyl ester functionalized monomer, or a combination comprising at least one of the foregoing.

Embodiment 8

The composition of any one of the preceding embodiments, wherein one or both of the first portion of the reactive particles and the second portion of the reactive particles comprise a particle shell.

Embodiment 9

The composition of Embodiment 8, wherein the particle shell comprises an amine, a solid particle, polystyrene, a crosslinked layer, or a combination comprising at least one of the foregoing. Preferably, the shell comprises the amine.

Embodiment 10

The composition of any one of the preceding embodiments, wherein the first portion of the reactive particles and the second portion of the reactive particles each independently comprises 25 to 80 wt % of the respective reactive monomer based on the total weight of the respective reactive particles.

Embodiment 11

The composition of any one of the preceding embodiments, wherein the first portion of the reactive particles and the second portion of the reactive particles each independently have an average particle diameter of 0.05 to 500 micrometers; wherein the average particle diameter is determined by using image analysis to determining the diameter of at least 500 particles and determining the average.

Embodiment 12

The composition of any one of the preceding embodiments, wherein a catalyst capable of polymerizing the first reactive monomer and the second reactive monomer is located in at least one of the first portion of the reactive particles, the second portion of the reactive particles, or a third portion of the reactive particles that comprises the catalyst located in a third matrix polymer.

Embodiment 13

The composition of any one of the preceding embodiments, wherein a catalyst and optional activator capable of polymerizing the self-reactive monomer is located in at least one of the first portion of the reactive particles, and a catalyst portion of the reactive particles that comprises the catalyst located in a third matrix polymer.

Embodiment 14

The composition of any one of the preceding embodiments, wherein the first reactive monomer comprises a polyol and the second reactive monomer comprises an isocyanate.

Embodiment 15

The composition of any one of Embodiments 1 to 13, wherein the first reactive monomer comprises an epoxy and the second reactive monomer comprises an amine hardener.

Embodiment 16

The composition of any one of Embodiments 1 to 13, wherein the first reactive monomer comprises an acid or an acid anhydride and the second reactive monomer comprises an alcohol.

Embodiment 17

The composition of any one of Embodiments 1 to 13, wherein the first reactive monomer comprises phenol and the second reactive monomer comprises formaldehyde.

Embodiment 18

The composition of any one of Embodiments 1 to 13, wherein the first reactive monomer comprises urea and the second reactive monomer comprises formaldehyde.

Embodiment 19

The composition of any one of Embodiments 1 to 13, wherein the first reactive monomer is a self-reactive monomer.

Embodiment 20

The composition of Embodiment 19, wherein the self-reactive monomer comprises a cyclic lactam monomer, a cyclic siloxane monomer, or a norbornene type monomer.

Embodiment 21

A method of making the plurality of reactive particles of any one of the preceding embodiments, comprising: polymerizing a first matrix monomer composition in the presence of the first reactive monomer to form the first portion of the reactive particles comprising the first reactive monomer located in the first polymer matrix.

Embodiment 22

A method of making the plurality of reactive particles of any one embodiments 1 to 20, comprising: polymerizing the first matrix monomer composition to form a plurality of particles and swelling the plurality of particles with the first reactive monomer to form the first portion of the reactive particles.

Embodiment 23

The method of Embodiment 21 or 22, further comprising polymerizing a second matrix monomer composition in the presence of the second reactive monomer to form the second portion of the reactive particles comprising the second reactive monomer located in the second polymer matrix; and combining the first portion of the reactive particles and the second portion of the reactive particles.

Embodiment 24

The method of Embodiment 21 or 22, further comprising polymerizing a second matrix monomer composition to form a second plurality of particles and swelling the second plurality of particles with the second reactive monomer to form the second portion of the reactive particles; and combining the first portion of the reactive particles and the second portion of the reactive particles.

Embodiment 25

The method of any one of Embodiments 21 to 24, wherein the polymerizing comprises suspension polymerizing.

Embodiment 26

The method of any one of Embodiments 21 to 25, wherein the polymerizing comprises emulsion polymerizing.

Embodiment 27

The method of any one of Embodiments 21 to 26, wherein the polymerizing comprises suspension polymerizing to form suspension polymerized particles and emulsion polymerizing to form emulsion polymerized particles; and combining the suspension polymerized particles and the emulsion polymerized particles to form the first portion of the reactive particles.

Embodiment 28

The method of any one of Embodiments 21 to 27 further comprising adding a shell to one or both of the first portion of the reactive particles and the second portion of the reactive particles.

Embodiment 29

A method of forming a coating, comprising: cold spraying a cold spray composition comprising the plurality of reactive particles of any one of the preceding embodiments onto a substrate at a velocity sufficiently high to cause the plurality of reactive particles to deform upon contact with the substrate causing the first reactive monomer to polymerize with the second reactive monomer to form the coating on the substrate.

Embodiment 30

A method of forming a coating, comprising: cold spraying a cold spray composition comprising the plurality of self-reactive particles of any one of the preceding embodiments at a velocity sufficiently high to cause the plurality of reactive particles to deform upon contact with the substrate causing the self-reactive monomer to polymerize with itself to form the coating on the substrate.

Embodiment 31

The method of any one of Embodiments 29 to 30, wherein the cold spraying comprises: mixing, into a gas stream having a working pressure and a working temperature, the plurality of reactive particles to provide the cold spray composition; passing the cold spray composition through a nozzle to accelerate the cold spray composition in a supersonic jet; and directing the supersonic jet onto the substrate.

Embodiment 32

The method of any one of Embodiments 29 to 31; wherein the cold spray composition comprises 20 to 80 wt % of the first portion of the reactive particles based on a total weight of the first portion of the reactive particles and the second portion of the reactive particles.

Embodiment 33

The method of any one of Embodiments 29 to 32; wherein the substrate is at a temperature of 100 to 400° C., or 150 to 300° C.

Embodiment 34

The method of any one of Embodiments 29 to 33; wherein one or both of the particle exit velocity from the nozzle can be 80 to 1,500 m/s, 300 to 1,500 m/s, or 90 to 600 m/s, or 500 to 1,000 m/s or a particle flow rate from the nozzle is 1 to 500 g/min, or 70 to 250 g/min.

Embodiment 35

The method of any one of Embodiments 29 to 34; wherein the cold spraying occurs at an applied voltage of 5 to 25 kV, or 10 to 13 kV.

Embodiment 36

The method of any one of Embodiments 29 to 35; wherein the cold spraying occurs using compressed air at 100 to 350 kPa, or 150 to 700 kPa.

Embodiment 37

A coating formed from the method of any one of Embodiments 29 to 34.

Embodiment 38

The composition of any one of the preceding embodiments, wherein the first portion of the reactive particles and the second portion of the reactive particles each independently have a glass transition temperature of less than or equal to 100° C., or −75 to 50° C., or −10 to 50° C., or −5 to 20° C. as determined in accordance with ASTM E1356-14.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended 8 s.

In general, the disclosure can alternately comprise, consist of, or consist essentially of, any appropriate components herein disclosed. The disclosure can additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

"Optional" or "optionally" means that the subsequently described event or circumstance may or may not occur, and that the description includes instances where the event occurs and instances where it does not. The term "combination" is inclusive of blends, mixtures, alloys, reaction products, and the like. Also, "combinations comprising at least one of the foregoing" means that the list is inclusive of each element individually, as well as combinations of two or more elements of the list, and combinations of at least one element of the list with like elements not named. The terms "first," "second," and the like, as used herein do not denote any order, quantity, or importance, but rather are used to distinguish one element from another. The notation "±10" means that the indicated measurement may be from an amount that is minus 10 to an amount that is plus 10 of the stated value.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising:
  a plurality of reactive particles; wherein at least a first portion of the reactive particles comprises a first reactive monomer embedded in a first matrix polymer;
  wherein the first reactive monomer comprises a self-reactive monomer or wherein the first reactive monomer can polymerize with a second reactive monomer embedded in a second matrix polymer of a second portion of the reactive particles to form a coating polymer;
  wherein the reactive particles have a glass transition of less than or equal to 100° C. and a particle size of 0.05 to 500 micrometers.

2. The composition of claim 1, further comprising the second portion of the reactive particles.

3. The composition of claim 2, wherein the first polymer matrix and the second polymer matrix each independently comprise a vinyl polymer; or wherein the first polymer matrix and the second polymer matrix each independently comprise a polyacrylate, a poly(acrylic acid), a polyolefin, polystyrene, poly(vinyl acetate), poly(vinyl alcohol), polychloroprene, a fluoro polymer, polyacrylonitrile, a polyurethane, or a combination comprising at least one of the foregoing.

4. The composition of claim 2, wherein the first polymer matrix and the second polymer matrix each independently comprise a polyacrylate; wherein the polyacrylate optionally comprises repeat units derived from a functionalized matrix monomer.

5. The composition of claim 2, wherein one or both of the first portion of the reactive particles or the second portion of the reactive particles comprise a particle shell; wherein the particle shell optionally comprises an amine, a solid particle, polystyrene, a crosslinked layer, or a combination comprising at least one of the foregoing.

6. The composition of claim 2, wherein the first portion of the reactive particles and the second portion of the reactive particles each independently comprises 25 to 80 wt % of the respective reactive monomer based on the total weight of the respective reactive particles.

7. The composition of claim 2, wherein the first portion of the reactive particles and the second portion of the reactive particles each independently have an average particle diameter of 0.05 to 500 micrometers; wherein the average diameter is determined by using image analysis to determining the diameter of at least 500 particles and determining the average.

8. The composition of claim 1, wherein a catalyst capable of polymerizing the first reactive monomer and the second reactive monomer or that is capable of polymerizing the self-reactive monomer is located in at least one of the first portion of the reactive particles, the second portion of the reactive particles, and a third portion of the reactive particles that comprises the catalyst located in a third matrix polymer.

9. The composition of claim 2, wherein the first reactive monomer comprises a polyol and the second reactive monomer comprises an isocyanate or wherein the first reactive monomer comprises an epoxy and the second reactive monomer comprises an amine hardener.

10. The composition of claim 2, wherein the first reactive monomer comprises an acid or an acid anhydride and the second reactive monomer comprises an alcohol; or the first reactive monomer comprises phenol and the second reactive monomer comprises formaldehyde; or the first reactive monomer comprises urea and the second reactive monomer comprises formaldehyde.

11. The composition of claim 1, wherein the first reactive monomer comprises the self-reactive monomer, wherein the self-reactive monomer optionally comprises a cyclic lactam monomer, a cyclic siloxane monomer, or a norbornene type monomer.

12. A method of making a plurality of reactive particles, comprising:
  polymerizing a first matrix monomer composition in the presence of the first reactive monomer to form the first portion of the reactive particles comprising the first reactive monomer embedded in the first polymer matrix; or
  polymerizing the first matrix monomer composition to form a plurality of particles and swelling the plurality of particles with the first reactive monomer to form the first portion of the reactive particles;
  wherein at least a first portion of the reactive particles comprises a first reactive monomer located in a first matrix polymer; and
  wherein the first reactive monomer comprises a self-reactive monomer or wherein the first reactive monomer can polymerize with a second reactive monomer embedded in a second matrix polymer of a second portion of the reactive particles to form a coating polymer;

wherein the reactive particles have a glass transition of less than or equal to 100° C. and a particle size of 0.05 to 500 micrometers.

13. The method of claim 12, further comprising polymerizing a second matrix monomer composition in the presence of the second reactive monomer to form the second portion of the reactive particles comprising the second reactive monomer embedded in the second polymer matrix; or polymerizing the second matrix monomer composition to form a second plurality of particles and swelling the second plurality of particles with the second reactive monomer to form the second portion of the reactive particles; and combining the first portion of the reactive particles and the second portion of the reactive particles.

14. The method of claim 12, wherein the polymerizing comprises suspension polymerizing or wherein the polymerizing comprises emulsion polymerizing.

15. The method of claim 12, wherein the polymerizing comprises suspension polymerizing to form suspension polymerized particles and emulsion polymerizing to form emulsion polymerized particles; and combining the suspension polymerized particles and the emulsion polymerized particles to form the first portion of the reactive particles.

16. The method of any one of claim 12 further comprising adding a shell to one or both of the first portion of the reactive particles and the second portion of the reactive particles.

17. A method of forming a coating, comprising:

cold spraying a cold spray composition comprising a plurality of reactive particles onto a substrate at a velocity sufficiently high to cause the plurality of reactive particles to deform upon contact with the substrate, wherein at least a first portion of the reactive particles comprises a first reactive monomer embedded in a first matrix polymer;

wherein the first reactive monomer comprises a self-reactive monomer or wherein the first reactive monomer can polymerize with a second reactive monomer embedded in a second matrix polymer of a second portion of the reactive particles to form a coating polymer;

wherein the reactive particles have a glass transition temperature of less than or equal to 100° C. and a particle size of 0.05 to 500 micrometers; and wherein the particle deformation upon contact with the substrate causes the first reactive monomer to polymerize with the second reactive monomer or causes the self-reactive monomer to polymerize to form the coating on the substrate.

18. The method of claim 17, wherein the cold spraying comprises:

mixing, into a gas stream having a working pressure and a working temperature, the plurality of reactive particles to provide the cold spray composition;

passing the cold spray composition through a nozzle to accelerate the cold spray composition in a supersonic jet; and directing the supersonic jet onto the substrate.

19. The method of claim 17; wherein the cold spray composition comprises 20 to 80 wt % of the first portion of the reactive particles based on a total weight of the first portion of the reactive particles and the second portion of the reactive particles.

* * * * *